US012402062B2

(12) United States Patent
Bönig et al.

(10) Patent No.: US 12,402,062 B2
(45) Date of Patent: Aug. 26, 2025

(54) MESH GATEWAY NETWORK AND METHOD (71) Applicant: DRYAD NETWORKS GMBH, Eberswalde (DE)

(72) Inventors: Marco Bönig, Dortmund (DE); Carsten Brinkschulte, Berlin (DE); Daniel Hollos, Berlin (DE)

(*) Notice: Subject to any disclaimer, the term of this patent is extended or adjusted under 35 U.S.C. 154(b) by 297 days.

(21) Appl. No.: 17/798,900

(22) PCT Filed: Feb. 11, 2021

(86) PCT No.: PCT/EP2021/053348
§ 371 (c)(1),
(2) Date: Aug. 11, 2022

(87) PCT Pub. No.: WO2021/160747
PCT Pub. Date: Aug. 19, 2021

(65) Prior Publication Data
US 2023/0088526 A1 Mar. 23, 2023

(30) Foreign Application Priority Data
Feb. 11, 2020 (DE) ...................... 10 2020 103 418.0

(51) Int. Cl.
*H04W 4/38* (2018.01)
*G08B 17/00* (2006.01)
(Continued)

(52) U.S. Cl.
CPC ........ *H04W 40/246* (2013.01); *G08B 17/005* (2013.01); *G08B 17/117* (2013.01);
(Continued)

(58) Field of Classification Search
CPC ....... H04W 4/38; H04W 88/16; H04W 84/18; G08B 17/005; G08B 17/117
See application file for complete search history.

(56) References Cited

U.S. PATENT DOCUMENTS

2014/0118143 A1   5/2014   Monacos et al.
2017/0104515 A1   4/2017   Holweg et al.
(Continued)

FOREIGN PATENT DOCUMENTS

CN   202472841   10/2012
CN   107659889   2/2018
(Continued)

OTHER PUBLICATIONS

Saldamli Gokay et al "Wildfire Detection using Wireless Mesh Network," 2019 Fourth International Conference on Fog and Mobile Edge Computing (FMEC), 2019, pp. 229-234, doi: 10.1109/FMEC. 2019.8795316. Jun. 10, 2019.
(Continued)

*Primary Examiner* — Derrick V Rose
(74) *Attorney, Agent, or Firm* — JMB DAVIS BEN-DAVID (57) ABSTRACT

The invention relates to a forest fire early detection system comprising a mesh gateway network having a network server, a plurality of first gateways, a second gateway and a plurality of end devices, wherein the first gateway communicates directly with other gateways and end devices of the mesh gateway network only and the second gateway communicates with the network server, and a corresponding method for performing forest fire early detection.

21 Claims, 9 Drawing Sheets

(51) Int. Cl.
  *G08B 17/117*  (2006.01)
  *H04L 1/1607*  (2023.01)
  *H04W 4/12*  (2009.01)
  *H04W 40/24*  (2009.01)
  *H04W 84/18*  (2009.01)
  *H04W 88/16*  (2009.01)

(52) U.S. Cl.
  CPC ............ *H04L 1/1607* (2013.01); *H04W 4/12* (2013.01); *H04W 4/38* (2018.02); *H04W 84/18* (2013.01); *H04W 88/16* (2013.01)

(56) References Cited

U.S. PATENT DOCUMENTS

| | | | |
|---|---|---|---|
| 2017/0230907 A1 | 8/2017 | Rose et al. | |
| 2018/0183875 A1 | 6/2018 | Liu et al. | |
| 2019/0166518 A1* | 5/2019 | Arora | H04W 92/045 |
| 2020/0107402 A1* | 4/2020 | Di Girolamo | H04W 88/16 |
| 2020/0228932 A1* | 7/2020 | Ernst | H04L 63/101 |

FOREIGN PATENT DOCUMENTS

| | | |
|---|---|---|
| CN | 108665667 | 10/2018 |
| CN | 108769940 | 11/2018 |
| CN | 110505296 | 11/2019 |
| DE | 10 2017 117 170 | 4/2017 |
| KR | 101532055 B1 * | 7/2015 |

OTHER PUBLICATIONS

Junguo Zhang et al "Forest fire detection system based on wireless sensor network," 2009 4th IEEE Conference on Industrial Electronics and Applications, 2009, pp. 520-523, doi: 10.1109/ICIEA.2009.5138260. May 25, 2009.

Liolis K et al "An automated fire detection and alerting application based on satellite and wireless communications," 2010 5th Advanced Satellite Multimedia Systems Conference and the 11th Signal Processing for Space Communications Workshop, 2010, pp. 270-277, doi: 10.1109/ASMS-SPSC.2010.5586913. Sep. 13, 2010.

LoRa Alliance, "LoRaWAN Backend Interfaces 1.0 Specification" Oct. 11, 2017, 75 pages.

* cited by examiner

MESH GATEWAY NETWORK AND METHOD

CROSS-REFERENCE TO RELATED APPLICATIONS

This is the U.S. National Stage of International Patent Application No. PCT/EP2021/053348 filed Feb. 11, 2021, which claims priority to German Patent Application No. 10 2020 103 418.0 filed Feb. 11, 2020, and German Patent Application No. 10 2021 103 229.6 filed Feb. 11, 2021.

The invention relates to a forest fire early detection system comprising a mesh gateway network having a network server, a plurality of first gateways, a second gateway and a plurality of end devices, wherein the first gateway communicates directly with other gateways and end devices of the mesh gateway network only and the second gateway communicates with the network server, and a corresponding method for performing forest fire early detection.

STATE OF THE ART

Systems for the early detection of forest fires are known. For this purpose, the area to be monitored is monitored by means of optical sensors that can detect smoke columns arising from a forest fire. These sensors are, for example, rotating cameras, but they have the disadvantage that they are less effective at night and are susceptible to false detections, e.g. dust clouds resulting from agricultural activities. In addition, optical systems can usually only detect the forest fire when it is already advanced and the smoke columns become visible over greater distances. Monitoring by means of an IR camera installed in a satellite from a high orbit has the disadvantage that the resolution of the cameras over the large distances prevents detection of forest fires in the early phase. A satellite is also expensive to purchase and maintain, especially when launching the satellite. Monitoring by mini-satellites in a low orbit has the disadvantage that the satellites are not geostationary, i.e. they need a certain amount of time for one orbit during which the area is not monitored. Close monitoring requires a large number of satellites, which are also expensive to launch. Satellite monitoring is also associated with high carbon dioxide emissions during launch.

It makes more sense to monitor the area using a number of inexpensive sensors that can be produced in series and work by means of optical smoke detection and/or gas detection. The sensors are distributed throughout the area and supply data to a base station via a communication link.

Such a system for early detection of forest fires is presented in US 2008/0309502 A1. Here, when a fire alarm is triggered, a sensor provides information to a nearby control terminal, which then triggers an alarm by means of a long-range radio frequency signal.

This system has the disadvantage that the control terminal triggers the alarm and must have a powerful RF unit to do so. The sensors require a GPS unit that constantly sends a signal to the control terminal, the power consumption of the sensors is therefore high, and the life of the energy sources (batteries) of the sensors is limited.

It is therefore the objective of the present invention to provide an early forest fire detection system that works reliably, can be expanded as required and is inexpensive to install and maintain.

It is also the objective of the present invention to provide a method for the early detection of a forest fire that works reliably, can be expanded as required and is inexpensive to install and maintain.

The objective is solved by means of the forest fire early detection system according to claim 1. Further advantageous embodiments of the invention are set out in the dependent claims.

The forest fire early detection system according to the invention comprises a mesh gateway network having a network server, a plurality of first gateways and a second gateway. Furthermore, the network has several end devices.

According to the invention, the first gateway communicates directly only with other gateways and end devices of the mesh gateway network. Accordingly, the mesh gateway network has first gateways that do not have a single-hop connection to a network server. In particular, the communication between end devices and a first gateway is a direct one, i.e. without further intermediate stations (single-hop connection). The communication between the gateways can take place through a direct single-hop connection; a multi-hop connection is also possible.

This simultaneously extends the range of the mesh gateway network because the first gateway is connected to the second gateway via a meshed multi-hop network and can thus forward the data of the end devices to the internet network server. The connection second gateway network server is wireless or wired.

In an alternative embodiment of the invention, the shortest connection between an end device of the forest fire early detection system according to the invention and a second gateway is a multi-hop connection. Preferably, the shortest connection between an end device of the forest fire early detection system according to the invention and a network server is a multi-hop connection comprising at least 3 hops. In a further embodiment, the shortest connection between a first gateway of the forest fire early detection system according to the invention and the network server is a multi-hop connection.

In another embodiment of the invention, the mesh gateway network of the forest fire early detection system comprises an LPWAN. LPWAN describes a class of network protocols for connecting low energy devices such as battery powered sensors to a network server. The protocol is designed to achieve long range and low energy consumption of the end devices at low operating costs.

In a further development of the invention, the mesh gateway network of the forest fire early detection system is a LoRaWAN mesh gateway network. LoRaWAN gets by with particularly low energy consumption. The LoRaWAN networks implement a star-shaped architecture by means of gateway message packets between the end devices and the central network server. The gateways are connected to the network server, while the end devices communicate with the respective gateway by communication via LoRa.

In another embodiment of the invention, the second gateway communicates with the network server via an internet connection. The internet connection is a wireless point-to-point connection, preferably using a standard internet protocol.

In a further embodiment of the invention, the end devices and/or the first gateways have a self-sufficient power supply. In order to be able to install and operate the end devices and the first gateways connected to them even in inhospitable and, in particular, rural areas far away from energy supply, the end devices and the first gateways are equipped with a self-sufficient energy supply. The energy supply can be provided e.g. by energy storage devices—also rechargeable.

In a further development of the invention, the self-sufficient energy supply has an energy storage device and/or an energy conversion device. In particular, the energy supply by means of solar cells should be mentioned, in which an energy conversion of solar-electric energy takes place. The electrical energy is usually stored in an energy storage device in order to ensure the energy supply even in times of low solar radiation (e.g. at night).

In a further embodiment of the invention, the end devices and the first gateways are operated off-grid. Due to the self-sufficient energy supply of end devices and first gateways, these devices can be operated autonomously without a supply network. Therefore, end devices and first gateways can be distributed and networked, especially in impassable areas that cannot be reached with conventional communication networks.

In another advantageous embodiment of the invention, the first gateways comprise an ACK signal generation unit. The ACK signal (from "acknowledgement") is a signal used in a data transmission to acknowledge receipt. This ensures that a message has been sent correctly. Similarly, the end device does not have to be active all the time. The power consumption is reduced and the operating time of the end device is thus increased.

An ACK generation unit in the sense of the present invention is a sub-server unit integrated into a gateway that performs functionalities and objectives intended for the network server according to the LoRaWAN protocol. ACK signals in the sense of the present invention are messages, commands and functions stored on the gateway or generated by a gateway. They may include the following MAC commands of the LoRaWAN protocol (LoRaWAN 1.1 specification of 11 Oct. 2017, Final Release):

Confirmed Uplink (UL)—best effort
Confirmed UL—end-to-end confirmation for mission-critical messages
Downlink (DL)
Confirmed DL
ResetInd, ResetConf (Sec. 5.1)
LinkCheckReq, LinkCheckAns (Sec. 5.2)
RekeyInd, RekeyConf (Sec. 5.10)
DeviceTimeReq, DeviceTimeAns (Sec. 5.12)
Join-request, Join-accept (Sec. 6.2.2, 6.2.3)

In a further embodiment of the invention, the ACK signal generation unit (ACK) comprises a processor and a memory. The processor and memory are standard components and therefore inexpensive to manufacture.

In another embodiment of the invention, the first gateways of the mesh gateway network are front-end gateways, and/or the second gateway is a border gateway. The division of the gateways into front-end gateways and border gateways considerably extends the range of the LoRaWAN network, whereby standard LoRaWAN-compatible end devices can still be used, which can be distributed and networked far into impassable areas that cannot be reached with conventional communication networks.

In a further embodiment of the invention, the first gateway has a first front-end gateway communication port for communication with an end device and a second front-end gateway communication port for communication with another first gateway and/or a second gateway. The first gateway is therefore suitable as a node for communicating both with a end device via single-hop connection (chirp frequency spread modulation or frequency modulation) and with a gateway via single-hop or preferably multi-hop connection as a meshed multi-hop communication network. Both connections use different protocols and therefore require different ports.

In a further embodiment of the invention, each first gateway is suitable for wireless point-to-point communication with a plurality of end devices using single-hop LoRa or FSK using the LoRaWAN protocol. Therefore, full compatibility with commercially available LoRa end devices is given. The gateway communicates with the end device via standard LoRaWAN communication protocol or via standard LoRa connection. It therefore does not need to be modified to take advantage of the mesh network. The mesh architecture is, so to speak, "transparent" for the end device.

In another embodiment of the invention, the first gateway and the second gateway are combined with a plurality of mesh gateway devices and at least one of the mesh gateway devices does not have a direct IP connection. Mesh gateways comprise a combination of the first gateways and the second gateways. The mesh gateways communicate with each other using multi-hop wireless networking, and at least one mesh gateway is connected to the network server using standard Internet protocol.

In another embodiment of the invention, the second gateway is for communicating with the network server by means of a standard LP connection and using the LoRaWAN protocol. At least one of the first gateways communicates directly with a second gateway. The second gateway sends the data of an end device directly to the network server using an internet protocol. This type of communication and division of the gateways into two types considerably extends the LoRaWAN network, whereby standard LoRaWAN-compatible end devices can still be used, which can be distributed and networked far into impassable areas that cannot be reached with conventional communication networks. These end devices are any commercially available devices that do not need to be adapted in order to use the advantages of the mesh network.

In a further embodiment of the invention, the second gateway has a first border gateway communication port for communication with a network server and a second border gateway communication port for communication with a first gateway. The second gateway is thus suitable for communicating with another gateway via single-hop or preferably multi-hop connection as a meshed multi-hop communication network. Communication with the network server can be wireless or wired via a standard Internet connection. Both connections use different protocols and therefore require different ports.

In a further embodiment of the invention, a first gateway (G1) is integrated with a second gateway (G2) in a mesh gateway (MGD). The first gateway and the second gateway are advantageously combined in one device, namely in a so-called "mesh gateway". Here, too, the integrated mesh gateways communicate with each other by means of a multi-hop communication network, while at least one integrated mesh gateway is connected to the network server via the standard Internet protocol.

In another embodiment of the invention, the mesh gateway network is a multi-hop wireless network. The first gateway is in communication with the second gateways via the meshed multi-hop wireless network and the data from the end devices is forwarded to the internetwork server. This eliminates the range imitation of the direct connection between end devices and gateways provided by the LoRaWAN standard.

The objective is further solved by means of the method for early detection of a forest fire.

The method for early detection of a forest fire has seven procedural steps: In the first procedure, a forest fire is detected by an end device. The end device has one or more suitable sensors for this purpose. In the second process step, a signal is generated in the end device. The signal is generated as a data packet by means of a processor arranged in the end device. In the third process step, the signal is sent from the end device to a first gateway. The transmission to a gateway is preferably wireless, but a wired transmission is also possible. In the fourth process step, the signal is received by the first gateway. The first gateway has suitable ports for this purpose and a memory on which the signal is stored. In the fifth process step, the signal is forwarded from the first gateway to a second gateway. This achieves a range extension of LoRaWAN networks by interposing the multi-hop network by means of gateways and thus maintaining complete compatibility with the LoRaWAN specification. In the sixth process step, the signal is received from the second gateway. In the seventh step, the signal is forwarded from the second gateway to a network server. At least one gateway communicates with the network server via a standard IP connection and using the LoRaWAN protocol.

In an alternative embodiment of the invention, the communication of the shortest connection between an end device of the forest fire early detection system according to the invention and a second gateway takes place via a multi-hop connection. Preferably, the communication of the shortest connection between an end device of the forest fire early detection system according to the invention and a network server takes place via a multi-hop connection comprising at least 3 hops. In a further embodiment, the communication of the shortest connection between a first gateway of the forest fire early detection system according to the invention and the network server takes place via a multi-hop connection.

In a further embodiment of the invention, an ACK signal is generated by the first gateway. The ACK signal is used during a data transmission to confirm the receipt of a data packet. The ACK signal ensures that a message is successfully received or transmitted. In this application, the ACK signal prevents the end device from getting a timeout.

In another embodiment of the invention, the ACK signal is sent from the first gateway to the end device. The ACK signal ensures that a message from the end device to a gateway has been correctly transmitted to the gateway. Similarly, the end does not need to have a permanently active download receive window and therefore be permanently active. The power consumption is reduced and the lifetime of the end device is thus increased. Another significant advantage is that by sending the ACK signal directly, the time specification in the end device for receiving the ACK signal is not exceeded. If the gateway (as provided for in the LoRaWAN standard) were to wait for the response of the network server, this would lead to a runtime overrun (RX1/RX2) in the end device (timeout), which can lead to a communication breakdown.

In another embodiment of the invention, the ACK signal is sent from the gateway to the end device via a single-hop connection. The gateway to end device connection is also a direct connection with only one hop of the ACK signal.

In a further development of the invention, the message is sent from the end device to the first gateway via a single-hop connection. The connection from the end device to the gateway is therefore a direct connection with only one hop of the data packet (the message). The end devices are connected to the respective gateway by communication via LoRa (chirp frequency spread modulation) or FSK (frequency modulation).

In another embodiment of the invention, the first gateway forwards the message to a second gateway and/or the network server. The first gateway and second gateway are connected to each other via a meshed multi-hop network so that the front-end gateway does not need a direct connection while communicating with the end devices. This simultaneously extends the range of the LoRaWAN network because the front-end gateway is connected to the border gateway via the meshed multi-hop network and can thus forward the data from the end devices to the Internet network server.

In a further embodiment of the invention, the ACK signal is generated and/or sent by a front-end gateway (FGD). The front-end gateways are connected to each other and to other gateways via a meshed multi-hop network, so that the border gateway does not need a direct connection for the network server to communicate with the end devices.

This simultaneously extends the range of the LoRaWAN network because the front-end gateway is connected to the border gateway via the meshed multi-hop communication network and can thus forward the data from the end devices to the internet network server. The ACK signal prevents the end device from receiving a timeout error. Likewise, the end device does not have to have a permanently active download receive window and must therefore be permanently active.

In another embodiment of the invention, the sending of the message from the end device and the reception of the message on the second gateway are done via different communication channels. The gateways are connected to the network server via the standard Internet protocol, while the end devices communicate with the respective gateway via communication using LoRa (chirp frequency spread modulation) or FSK (frequency modulation). The connection is thus a single-hop communication network in which the end devices communicate directly with one or more gateways, which then forward the data traffic to the internet The front-end gateways and the border gateways are connected to each other via a meshed multi-hop communication network MHF. This means that the front-end gateway does not need a direct internet connection while communicating with the standard end devices. The range of the LoRaWAN network is significantly extended because the front-end gateway is in connection with the border gateways via the meshed multi-hop communication network and can forward the data of the end devices to the internet network server. This eliminates the range imitation of the direct connection between end devices and gateways provided by the LoRaWAN standard.

Examples of embodiments of the forest fire early detection system according to the invention and of the method according to the invention for the early detection of a forest fire are shown schematically in simplified form in the drawings and are explained in more detail in the following description.

Showing.

Figure 1:
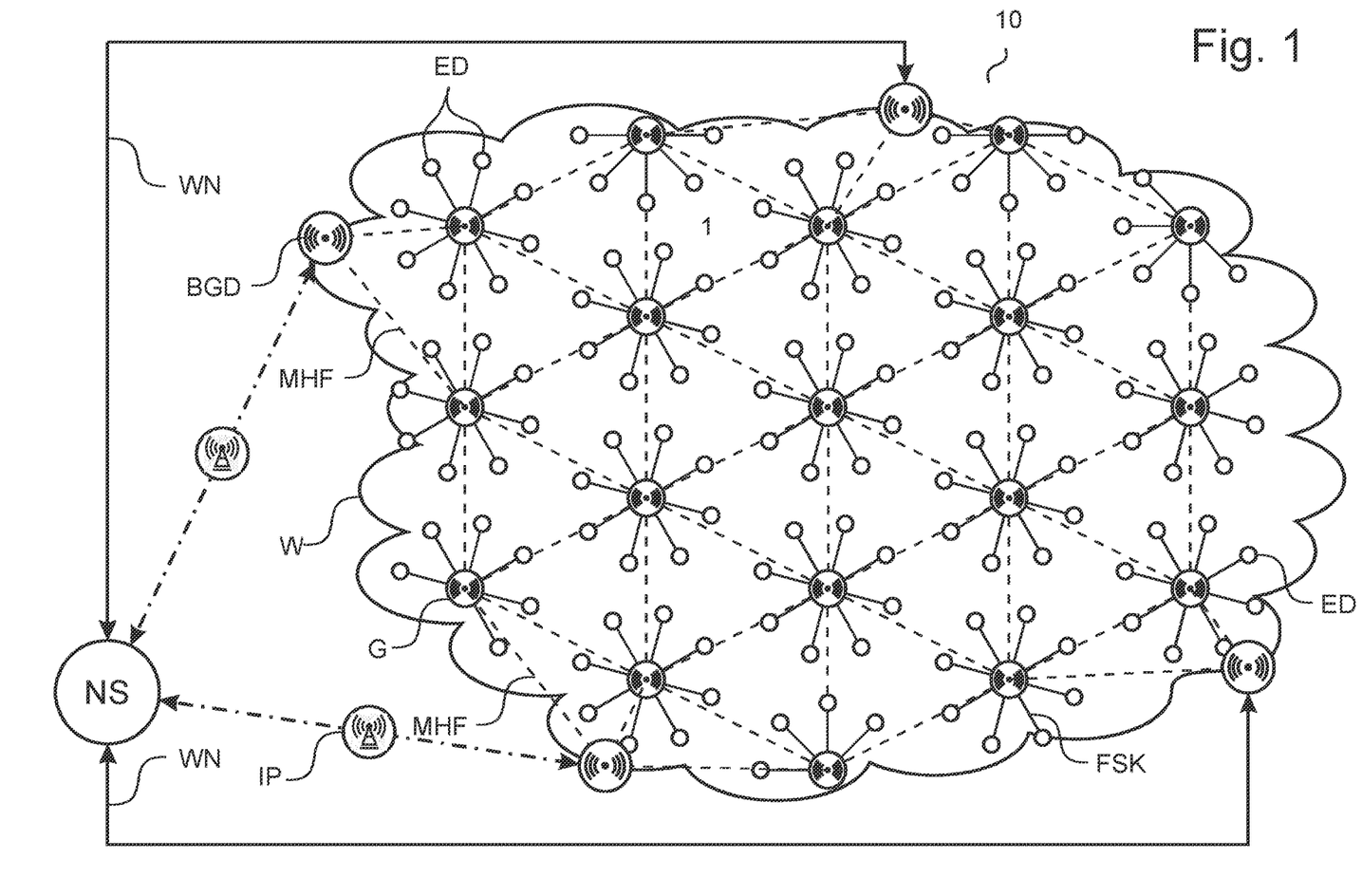
FIG. 1 Forest fire early detection system

An example of a forest fire early detection system 10 according to the invention is shown in FIG. 1. The forest fire early detection system 10 has a mesh gateway network 1 that uses the technology of a LoRaWAN network. The LoRaWAN network has a star-shaped architecture in which message packets are exchanged between the sensors ED and a central Internet network server NS by means of gateways. The forest fire early detection system 10 has a plurality of sensors ED connected to gateways G via a single-hop connection FSK. The gateways G1 are typically front-end gateways FGD. The front-end gateways FGD are connected to each other and partly to border gateways G2. A border gateway G2 can also be combined with a front-end gateway FGD to form a mesh gateway device MDG in one device. The border gateways G2 are connected to the internet network server NS, either via a wired connection WN or via a wireless connection using internet protocol IP.

The front-end gateways FGD and the border gateways G2 are connected to each other via a meshed multi-hop communication network MHF, so that a front-end gateway FGD does not require a direct connection to the Internet network server NS. This achieves a range extension of LoRaWAN networks by interposing a multi-hop network by means of frontend gateways FGD, thus achieving full comptability to the LoRaWAN specification.

Figure 2:
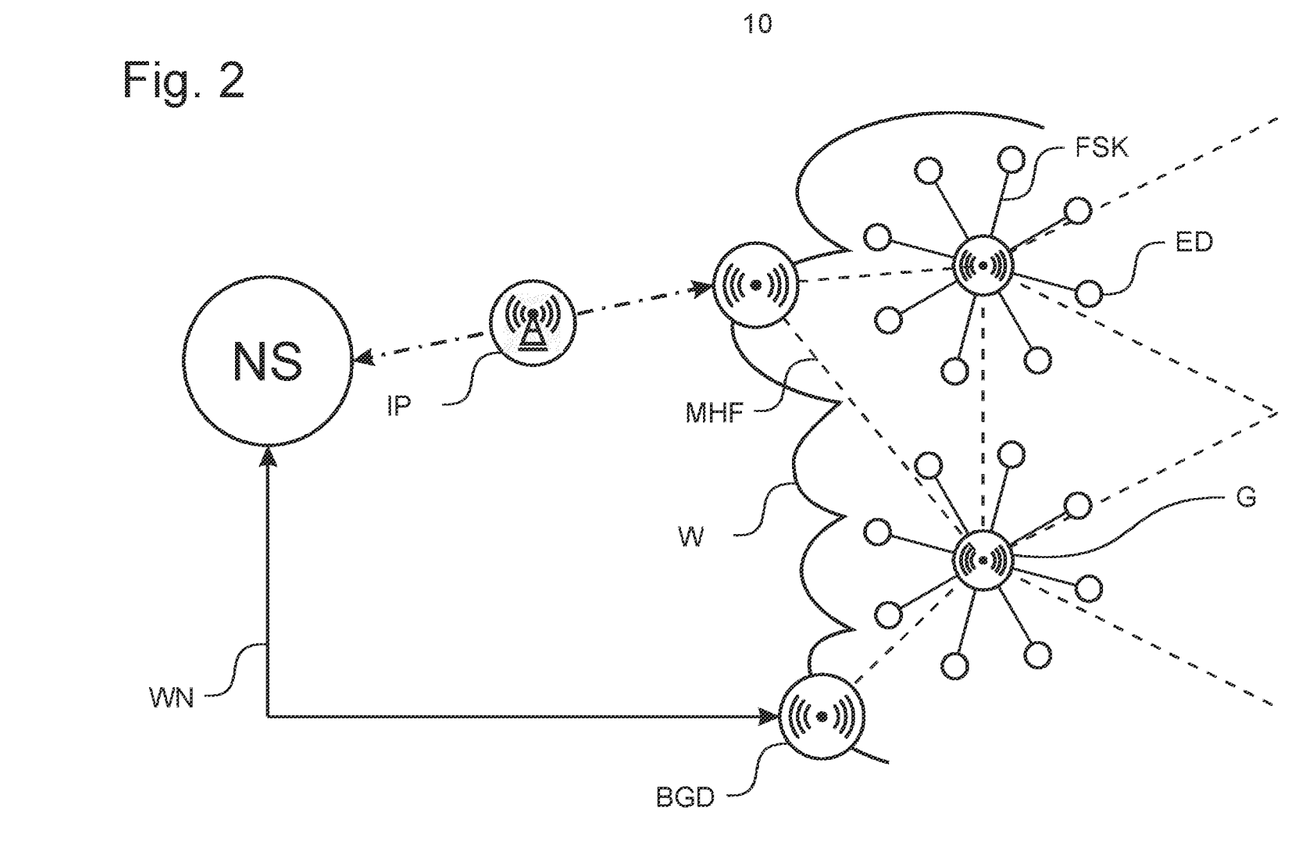
FIG. 2 Detailed view of the forest fire early detection system according to the invention FIG. 3 Detailed view of a LoRaWAN communication network of the forest fire early detection system according to the invention FIG. 4*a-c* Examples of the end device FIG. 5*a-c* Example of the gateway FIG. 6*a-c* Example of the border gateway FIG. 7 Standard LoRa communication network FIG. 8 Embodiment of the invention in the LoRaWAN network FIG. 9 Alternative embodiment of the invention in the LoRaWAN network.

A detailed view of a forest fire early detection system 10 according to the invention is shown in FIG. 2. The forest fire early detection system 10 has a plurality of end devices ED equipped with sensors, with eight end devices ED each communicating with a gateway G1 via a single-hop connection FSK. The gateways G1 are front-end gateways FGD. The front-end gateways FGD are connected to each other and to border gateways G2. The border gateways G2 are connected to the internet network server NS, either via a wired connection WN or via a wireless connection using internet protocol IP.

Figure 3:
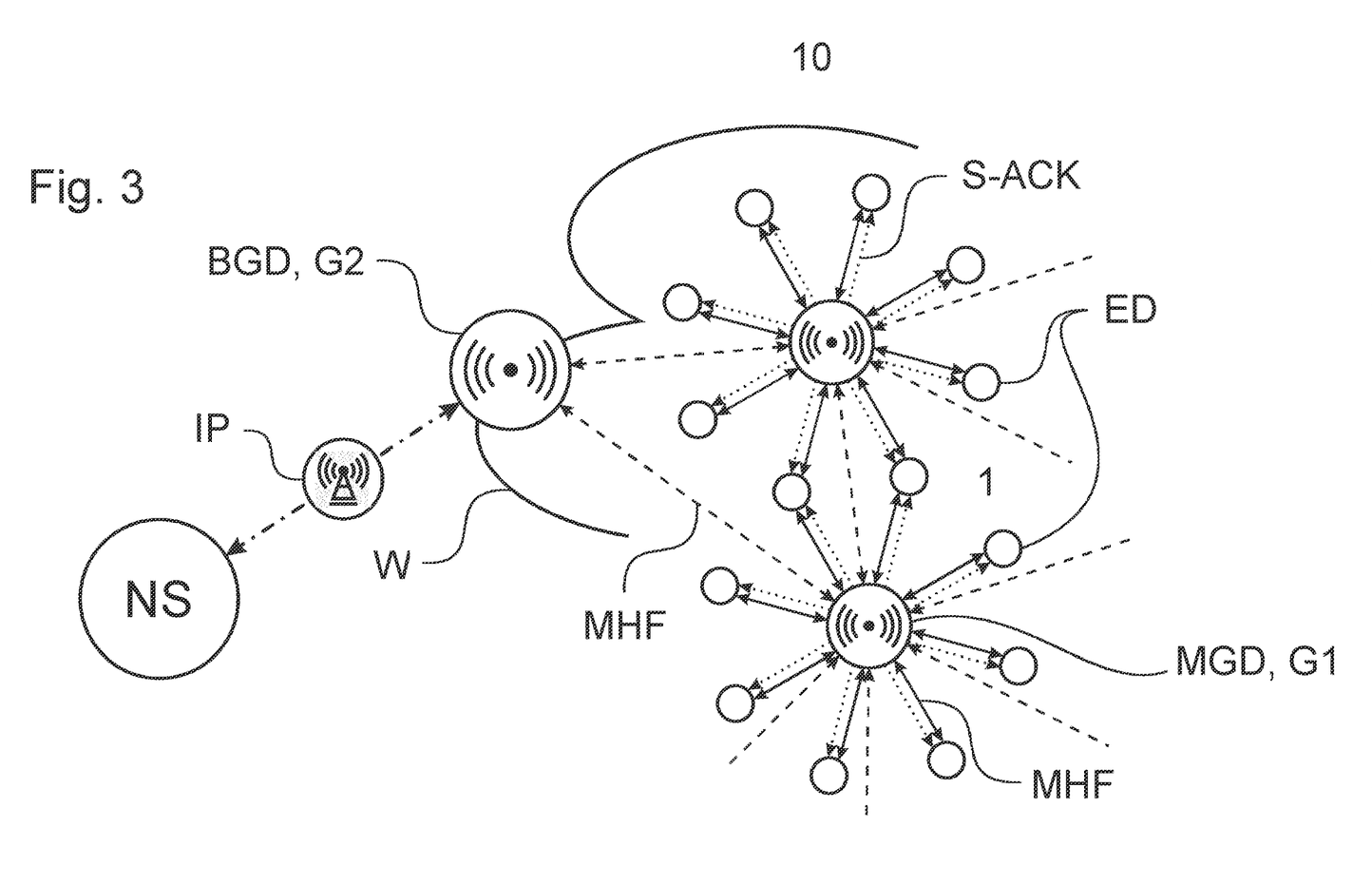

FIG. 3 shows a detailed view of the forest fire early detection system 10 according to the invention, whereby ACK signals S-ACK are exchanged. The forest fire early detection system 10 has a plurality of sensors ED connected to a gateway G1 via a single-hop connection FSK. Two sensors ED are connected to two gateways G1 each. In contrast to the previous embodiment example (FIG. 2), here an ACK signal is sent to the sensors ED by the gateway G1 connected to the sensor ED after the gateway G1 has received a message from the sensor ED. The ACK signal may be a signal for the sensor ED to close a download receive time window and enter monitoring mode. The front-end gateways FGD are connected to each other and to border gateways G2. The border gateways G2 are connected to the internet network server NS via internet protocol IP.

Figure 4A:
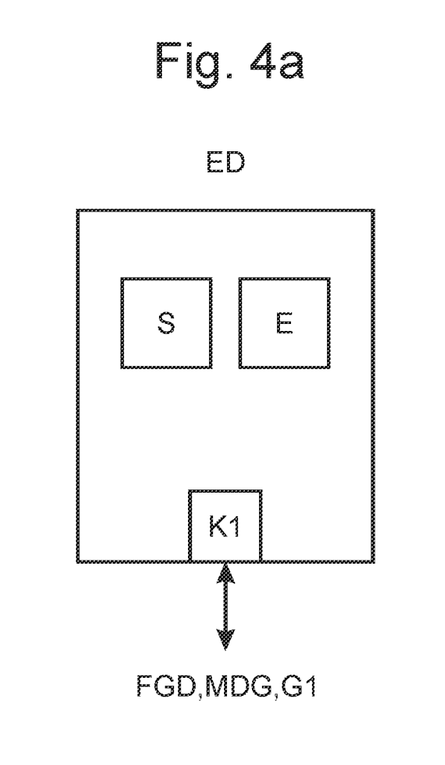
Figure 4B:
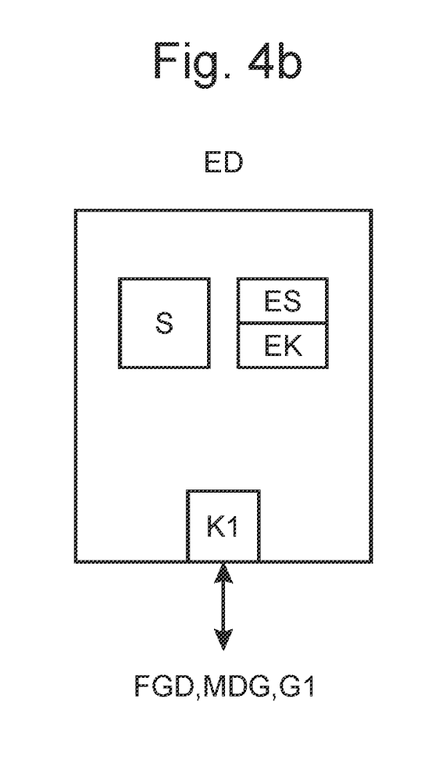
Figure 4C:
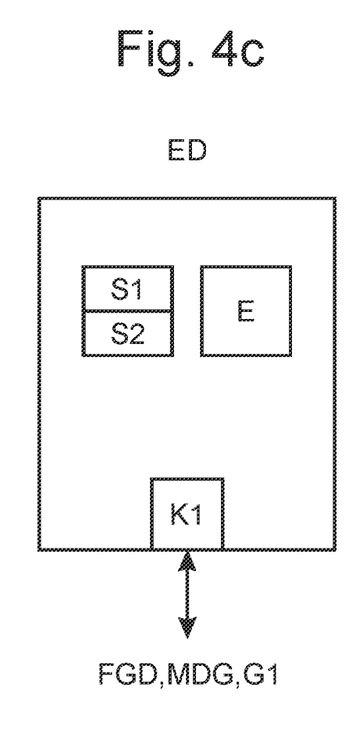

FIG. 4 shows three variants of an example of an end device ED. The end device ED is a sensor for detecting a forest fire. In order to be able to install and operate the sensor ED in inhospitable and especially rural areas far away from energy supply, the sensor ED is equipped with a self-sufficient energy supply E. In the simplest case, the energy supply E is a battery which can also be recharged. In the simplest case, the energy supply E is a battery, which can also be rechargeable (FIG. 4*a*). However, it is also possible to use capacitors (FIG. 4*c*), especially supercapacitors. The use of solar cells (FIG. 4*b*) is somewhat more complex and cost-intensive, but offers a very long service life of the sensor ED. In addition to the energy conversion EK by the solar cell, a memory ES and power electronics are also arranged in the sensor ED. Furthermore, a sensor ED has the actual sensor unit S (FIG. 4*a, b*), which detects a forest fire, e.g. by means of optical and/or electronic processes. The sensor unit S can also be of two-stage design (FIG. 4*c*). The sensor ED additionally has the communication port K1. By means of the communication port K1, messages of the end device ED, in particular measurement data, are sent as a data packet wirelessly by means of a single-hop connection FSK via LoRa (chirp frequency spread modulation) or frequency modulation to a gateway G1, FGD, MDG. All the above-mentioned components are arranged in a housing for protection against the effects of weather.

Figure 5A:
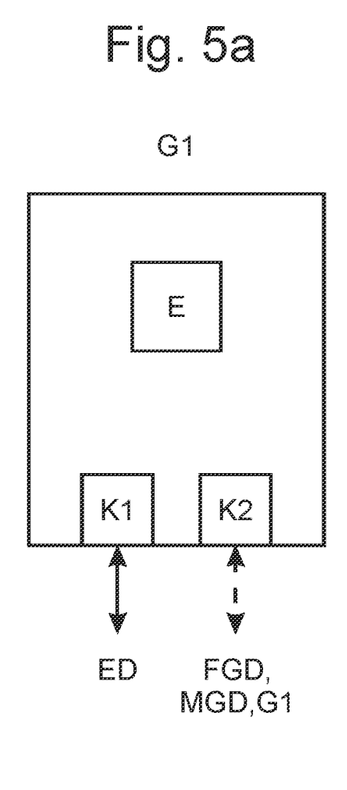
Figure 5B:
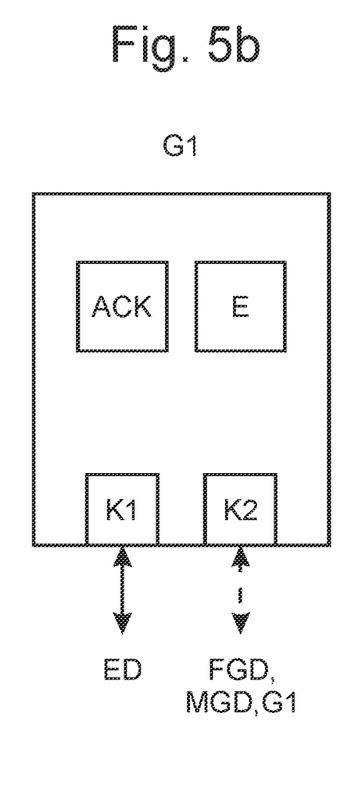
Figure 5C:
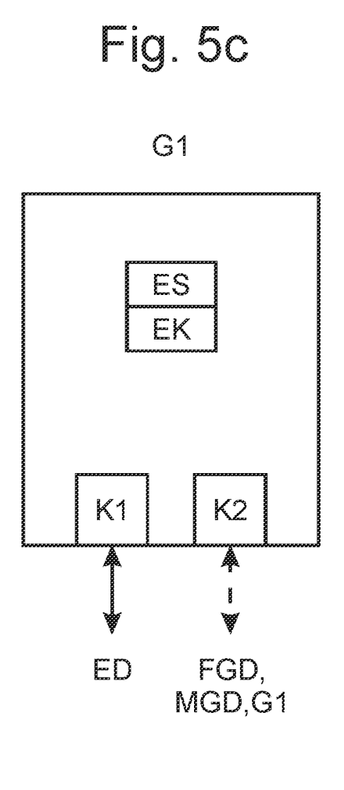

Three variants of an implementation example of a first gateway G1 are shown in FIG. 5. The gateway G1 is a front-end gateway FGD, which can also be designed as a mesh gateway. Like a sensor ED, the gateway G1 also has a self-sufficient energy supply E by means of e.g. batteries or capacitors (FIG. 5*a, b*); an energy supply by means of energy conversion EK by a solar cell and additional memory ES (FIG. 5*c*) is also possible. The gateway G1 has the communication port K1. By means of the communication port K1, messages from the end device ED, in particular measurement data, are received wirelessly as a data packet by the gateway G1 by means of a single-hop connection FSK via LoRa (circular frequency spread modulation) or frequency modulation. In addition, the ACK signal generated in the ACK generation unit ACK is sent to the end device ED (FIG. 5*b*).

Figure 6A:
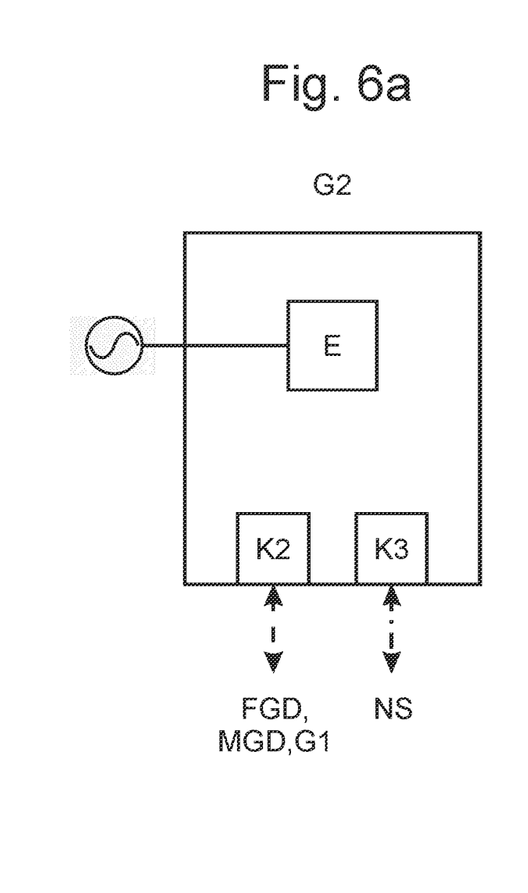
Figure 6B:
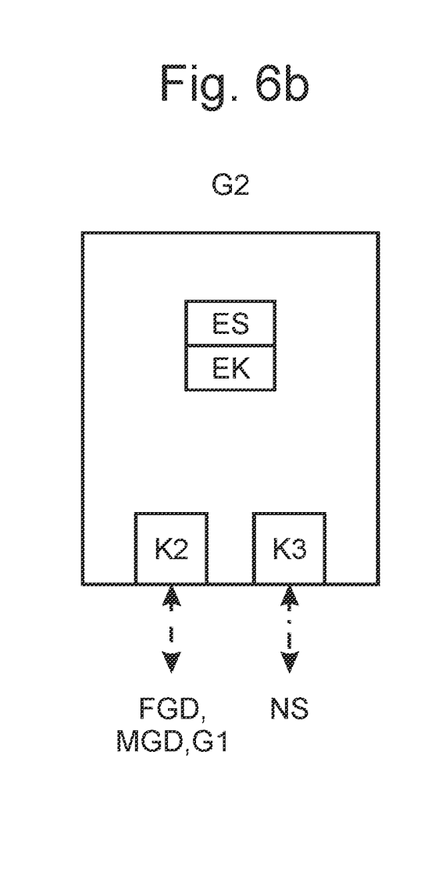
Figure 6C:
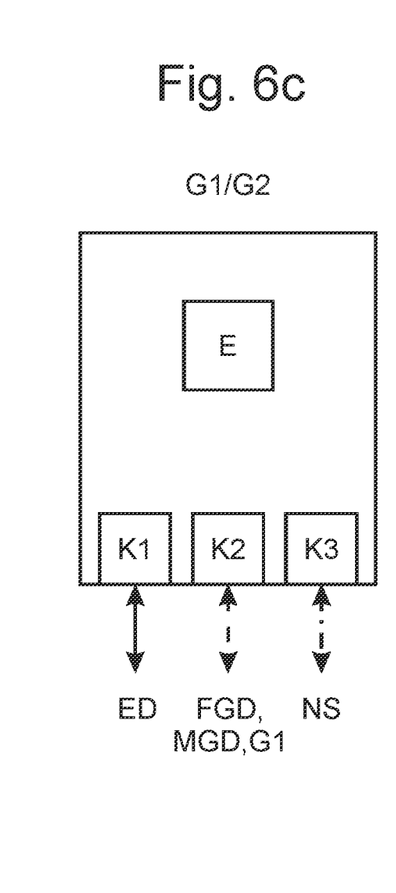

FIG. 6 shows three variants of an example of a border gateway G2. The border gateway G1 also has a self-sufficient energy supply E by means of e.g. batteries, capacitors or energy conversion EK by a solar cell and additional storage ES (FIG. 6*b, c*); an energy supply by means of a mains connection P is also possible (FIG. 6*a*). By means of the communication port K2, the gateway G2 communicates with other gateways G1, FGD, MGD via a multi-hop communication network MHF. The border gateway G2 is connected to the internet network server NS by means of the communication port K3. In the version of the border gateway G2 as a mesh gateway, the gateway G1/G2 (FIG. 6*c*) has the communication port K1 with which messages from the end device ED, in particular measurement data, are received as data packets wirelessly by means of a single-hop connection FSK via LoRa (circular frequency spread modulation) or frequency modulation. In addition, the ACK signal generated in the ACK generation unit ACK is sent to the end device ED.

Figure 7:
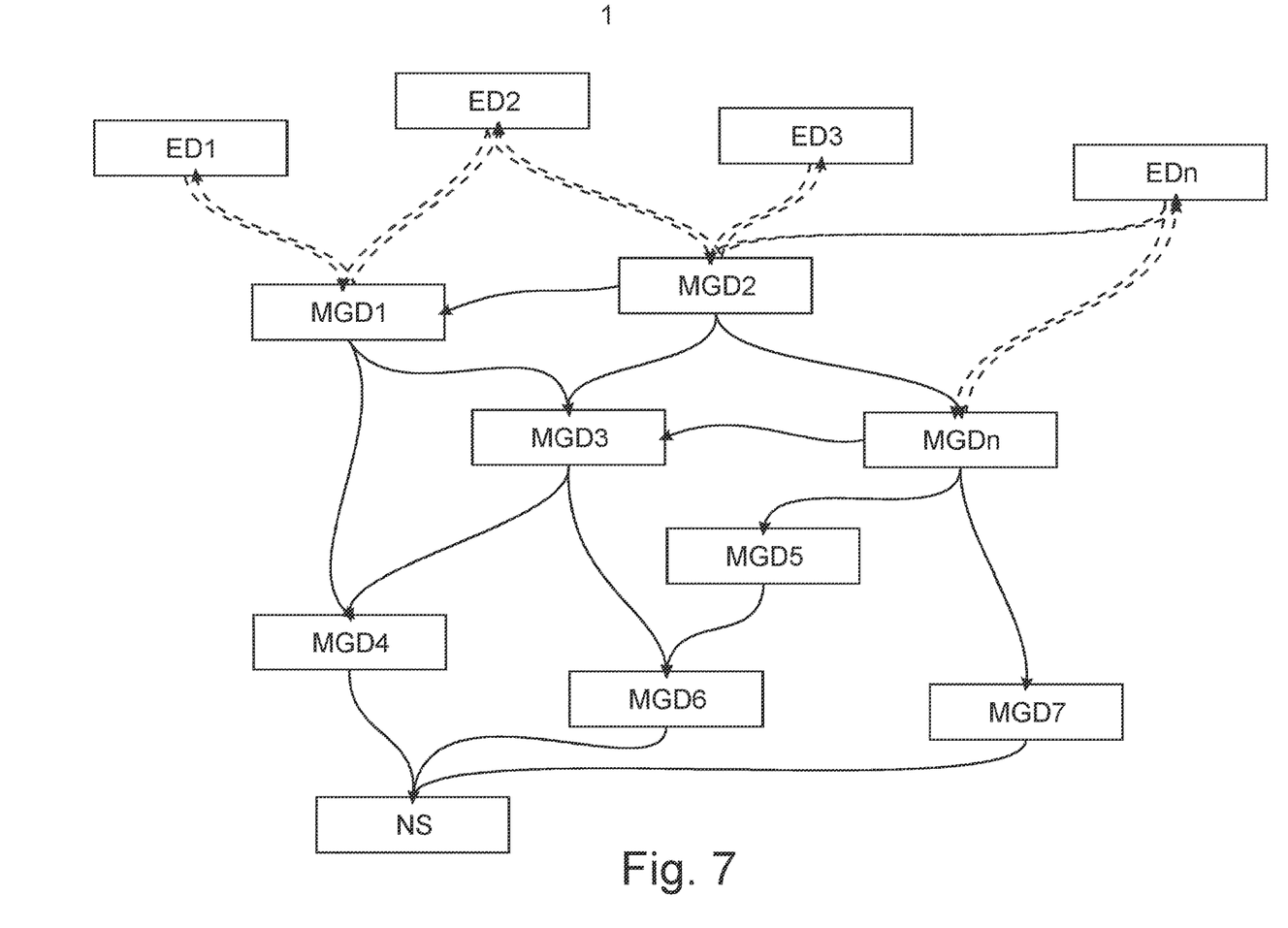

FIG. 7 schematically shows an embodiment of the LoRaWAN network 1 in which the forest fire early detection system 10 according to the invention is integrated. The front-end gateways FGD and border gateways G2 described in FIGS. 5*a-c* and 6*a-c* are combined in one device. These mesh gateways MDGn consist of a combination of the front-end gateways FGDn and the border gateways G2. The mesh gateways MDGn communicate with each other by means of multi-hop communication network MHF and at least one mesh gateway MDG is connected to the network server NS via the standard internet protocol IP over a cable connection WN. A mesh gateway MDGn sends an ACK signal ACK to the end device EDn that sent the message after receiving a message from a ned EDn. This ensures that the end device EDn does not receive a timeout. Likewise, the end device EDn does not have to have a permanently active download receive window and therefore does not have to be constantly active. The power consumption is reduced and the operating time of the end devices EDn is increased.

Figure 8:
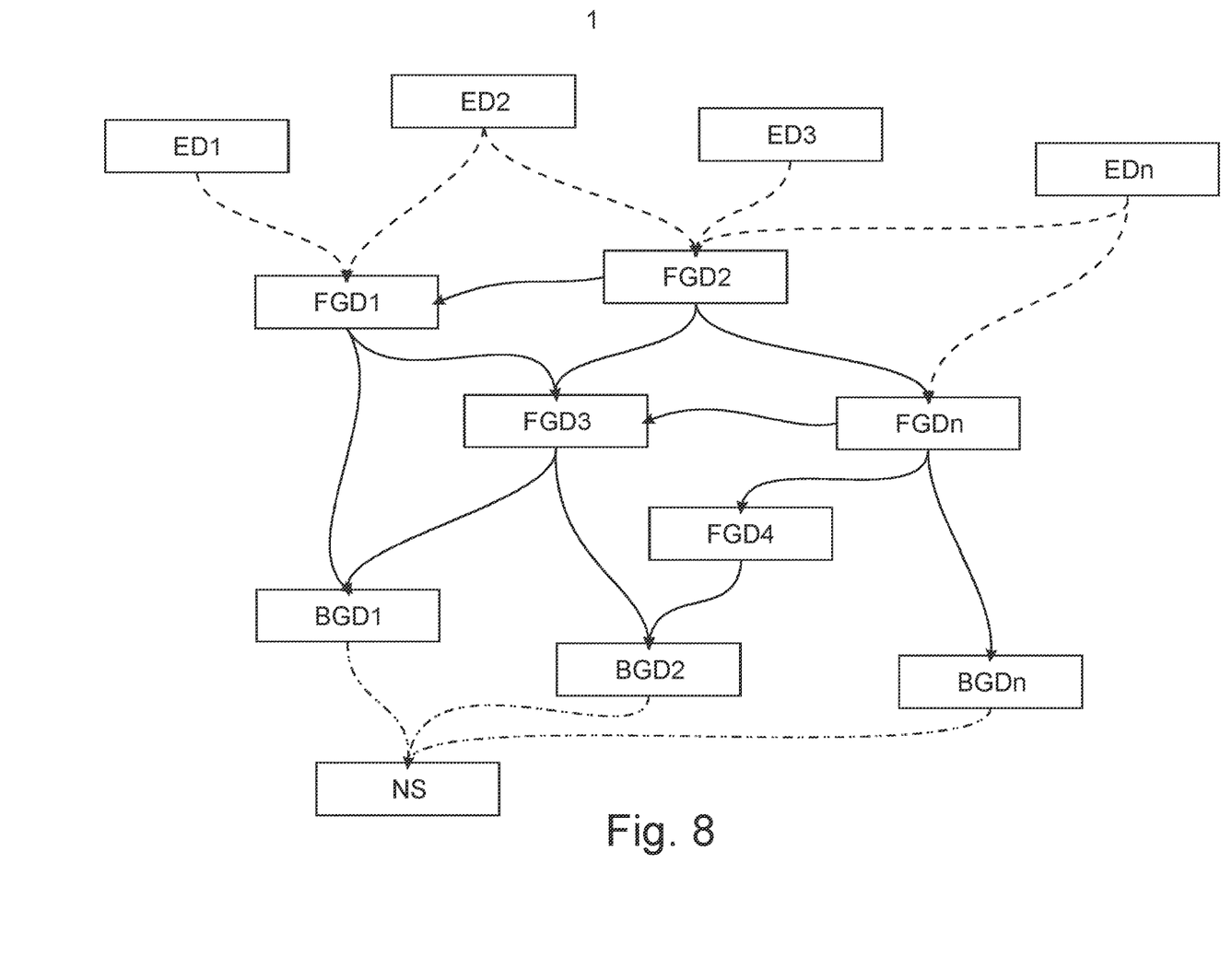

FIG. 8 schematically shows another embodiment of the LoRaWAN network 1 in which the forest fire early detection system 10 according to the invention is integrated. The network 1 has a plurality of sensors ED connected to gateways G via a single-hop connection FSK. The gateways G1 are typically front-end gateways FGD. The front-end gateways FGD are connected to each other and partly to border gateways G2. A border gateway G2 can also be combined with a front-end gateway FGD to form a mesh gateway device MDG in one device. The border gateways G2 are connected to the internet network server NS via a wireless connection using internet protocol IP. The front-end gateways FGD and the border gateways G2 are connected to each other via a meshed multi-hop communication network MHF, so that a front-end gateway FGD does not need a direct connection to the internet network server NS. This achieves a range extension of LoRaWAN networks by interconnecting a multi-hop network by means of front-end gateways FGD, thus achieving full compatibility with the LoRaWAN specification.

Figure 9:
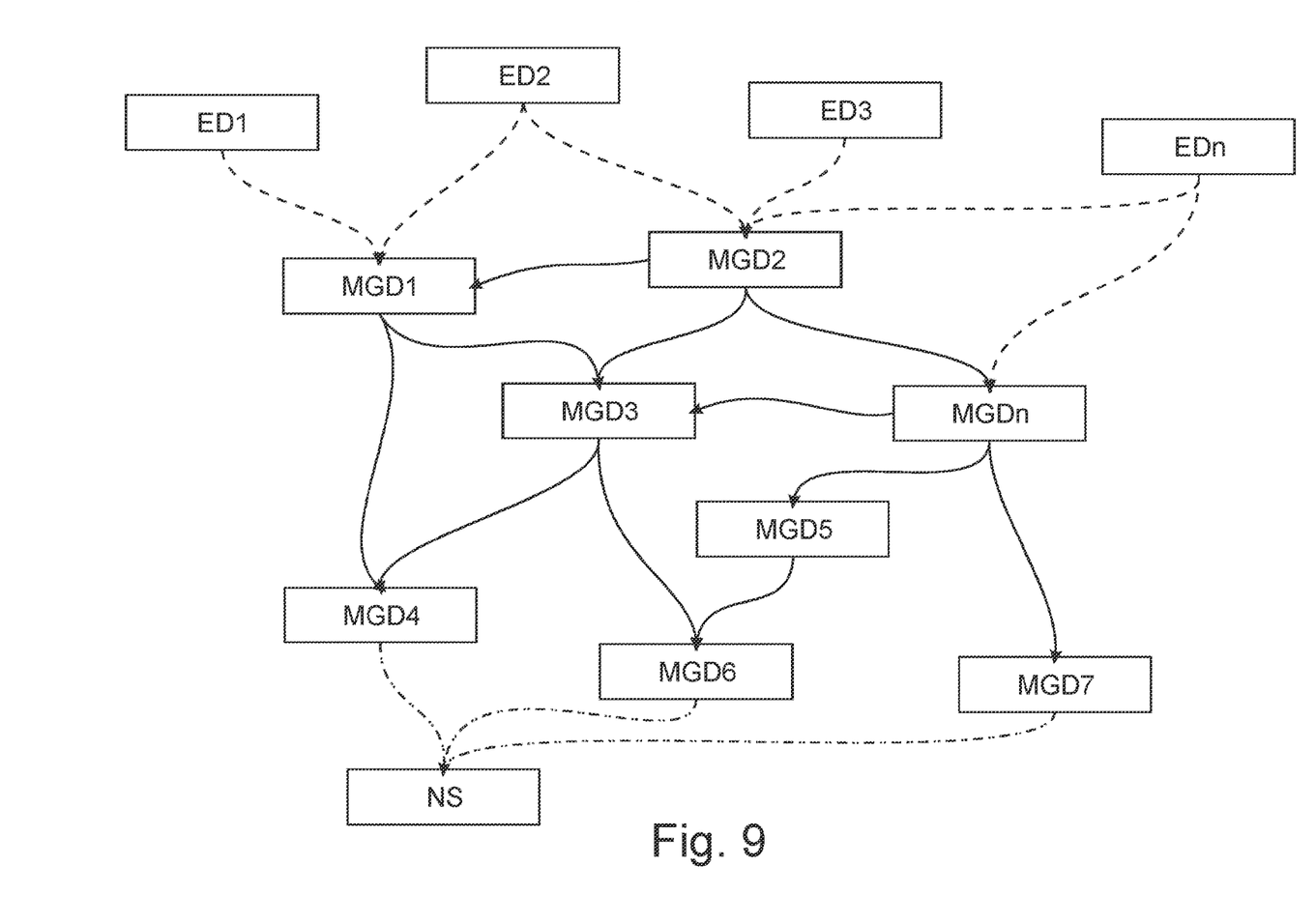

FIG. 9 schematically shows another embodiment of the LoRaWAN network 1 in which the forest fire early detection system 10 according to the invention is integrated. Front-end gateways FGD and border gateways G2 are combined in one device. These mesh gateways MDGn consist of a combination of the front-end gateways FGDn and the boundary gateways BGDn. The mesh gateways MDGn communicate with each other via multi-hop communication network MHF and at least one mesh gateway MDG is connected to the network server NS via the standard internet protocol IP.

REFERENCE LIST

1 Mesh gateway network
10 Forest fire early detection system
ED, EDn1 End devices/sensors
G1 Gateway
G2 Border gateway
NS Internet network server
IP Internet Protocol
FGD, FGDn Front-end gateways
MHF Multi-hop communication network
MDG, MDGn Mesh gateways
FSK FSK modulation
WN Wired connection
S Memory
E Energy supply
ES Energy storage
EK Energy conversion
K1 Communication port to the end device
K2 Communication port to the gateway
K3 Communication port to the Internet network server
ACK ACK signal generation unit
S-ACK ACK signal
W Forest
P Power/mains connection

The invention claimed is:

1. A forest fire early detection system (10) comprising a mesh gateway network (1) with
  A network server (NS),
  several first gateways (G1),
  a second gateway (G2) and
  multiple end devices (ED), |
  characterized in that the first gateway (G1) communicates directly only with other gateways (G1, G2) and end devices (ED) of the mesh gateway network (1) and the second gateway (G2) communicates with the network server (NS),
  wherein the first gateways (G1) of the mesh gateway network (1) are front-end gateways (FGD) and/or the second gateway (G2) is a border gateway (BGD)) and, wherein the first gateway (G1) has a first front-end gateway communication port (K1) for communication with an end device (ED) and a second front-end gateway way communication port (K2) for communication with another first gateway (G1) and/or a second gateway (G2).

2. The forest fire early detection system (10) according to claim 1 characterized in that the mesh gateway network (1) comprises an LPWAN.

3. The forest fire early detection system (10) according to claim 2 characterized in that the mesh gateway network (1) comprises a LORaWAN.

4. The forest fire early detection system (10) according to claim 1, characterized in that the second gateway (G2) has a communication port that provides an Internet connection (IP) with the network server (NS).

5. The forest fire early detection system (10) according to claim 1, characterized in that the end devices (ED) and/or the first gateways (G1) have a self-sufficient power supply (E), whereas the self-sufficient energy supply (E) comprises an energy storage device (ES) and/or energy conversion device (EK).

6. The forest fire early detection system (10) according to claim 1, characterized in that the end devices (ED) and the first gateways (G1) are operated off-grid.

7. The forest fire early detection system (10) according to claim 1, characterized in that the first gateways (G1) have an ACK signal generation unit (ACK), whereas the ACK signal generation unit (ACK) comprises a processor and a memory.

8. The forest fire early detection system (10) according to claim 1, characterized in that the first gateway (G1) has the ACK signal generation unit (ACK).

9. The forest fire early detection system (10) according to claim 1, characterized in that each first gateway (G1) is suitable for wireless point-to-point communication with a plurality of end devices (ED) using single-hop (FSK) LoRa or FSK using the LoRaWAN protocol.

10. The forest fire early detection system (10) according to claim 1, characterized in that the first gateway (G1) and the second gateway (G2) are combined with a plurality of mesh gateway devices (MGD) and at least one of the mesh gateway devices (MGD) does not have a direct IP connection (IP).

11. The forest fire early detection system (10) according to claim 1, characterized in that the second gateway (G2) is intended to communicate with the network server (NS) via a standard IP connection and using the LORaWAN protocol, whereas the second gateway (G2) has a first border gateway communication port (K3) for communication with a network server (NS) and a second border gateway communication port (K2) for communication with a first gateway (G1).

12. The forest fire early detection system (10) according to claim 1, characterized in that a first gateway (G1) is integrated with a second gateway (G2) in a mesh gateway (MGD).

13. The forest fire early detection system (10) according to claim 1, characterized in that the mesh gateway network (1) is a multi-hop wireless network.

14. A method for the early detection of a forest fire with the steps
  Detection of a forest fire from an end device (ED)
  Generation of a signal in an end device (ED)
  Sending the signal from the end device to a first gateway (G1)
  Receiving the signal on the first gateway (G1)
  Forwarding the signal from the first gateway (G1) to a second gateway (G2)
  Receiving the signal on the second gateway (G2)
  Forwarding the signal from the second gateway (G2) to a network server (NS), wherein the end device (ED), the first gateway (G1), the second gateway (G2) and the network server (NS) are part of a mesh gateway network, wherein the first gateways (G1) of the mesh gateway network (1) are front-end gateways (FGD) and/or the second gateway (G2) is a border gateway (BGD) and wherein the first gateway (G1) communicates to the end device by a first front-end gateway communication port (K1) and to another first gateway (G1) and/or a second gateway (G2) by a second front-end gateway communication port (K2).

15. The method for early detection of a forest fire according to claim 14, characterized in that an ACK signal (S-ACK) is generated by the first gateway (G1), whereas the ACK signal (S-ACK) is sent from the first gateway (G1) to the end device (ED), whereas the ACK signal (S-ACK) is sent from the first gateway (G1) to the end device (ED) via a single-hop connection.

16. The method for early detection of a forest fire according to claim 14, characterized in that the message is sent from the end device (ED) to the first gateway (G1) via a single-hop connection.

17. The method for early detection of a forest fire according to claim 14, characterized in that the first gateway (G1) forwards the message to a second gateway (G2) and/or the network server (NS).

18. The method for early detection of a forest fire according to claim 14, characterized in that the ACK signal (S-ACK) is generated and/or sent by a front-end gateway (FGD).

19. The method for early detection of a forest fire according to claim 14, characterized in that the sending of the message from the end device (ED) and the reception of the message on the second gateway (G2) takes place via different communication channels.

20. The method for early detection of a forest fire according to claim 14, characterized in that the sending of the message from the first gateway (G1) and the sending of the message from the second gateway (G2) to the network server (NS) is done via different communication channels.

21. The method for early detection of a forest fire according to claim 14, characterized in that and the sending of the message from the first gateway (G1) the reception of the message on the network server (NS) takes place via different communication channels.

* * * * *